United States Patent
Hotta et al.

(10) Patent No.: US 10,393,049 B2
(45) Date of Patent: Aug. 27, 2019

(54) INTERNAL COMBUSTION ENGINE

(71) Applicant: TOYOTA JIDOSHA KABUSHIKI KAISHA, Toyota-shi, Aichi-ken (JP)

(72) Inventors: Shintaro Hotta, Susono (JP); Hiroyuki Tanaka, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 8 days.

(21) Appl. No.: 15/468,453

(22) Filed: Mar. 24, 2017

(65) Prior Publication Data

US 2017/0276082 A1    Sep. 28, 2017

(30) Foreign Application Priority Data

Mar. 28, 2016 (JP) ................. 2016-063500

(51) Int. Cl.
*F02D 41/14* (2006.01)
*F02D 35/02* (2006.01)
(Continued)

(52) U.S. Cl.
CPC .......... *F02D 41/1498* (2013.01); *F01L 1/047* (2013.01); *F01L 1/053* (2013.01);
(Continued)

(58) Field of Classification Search
CPC ............... F02D 41/1498; F02D 35/027; F02D 41/0052; F01L 1/047; F01L 1/053; F01L 1/12; F01L 1/18; F01L 1/181; F01L 1/26; F01L 1/34; F01L 1/344; F01P 3/02; F01P 5/10; F01P 7/165; F01P 7/167; F02F 3/22; F02P 5/04; F02P 5/152
See application file for complete search history.

(56) References Cited

U.S. PATENT DOCUMENTS 6,062,189 A * 5/2000 Kaneko ................. F02B 17/005
                                                            123/295
2003/0150406 A1   8/2003 Takagi et al.
(Continued)

FOREIGN PATENT DOCUMENTS

JP   H08338272 A   12/1996
JP   2001214844 A   8/2001
(Continued)

*Primary Examiner* — Syed O Hasan
(74) *Attorney, Agent, or Firm* — Hunton Andrews Kurth LLP (57) ABSTRACT

The control apparatus operates an engine water temperature adjustment apparatus so that the temperature of cooling water that passes through an engine head enters a first temperature region in a lean mode, and operates the engine water temperature adjustment apparatus so that the temperature of the cooling water enters a second temperature region that is lower than the first temperature region in a stoichiometric mode. When knocking is detected after switching is started from the lean mode to the stoichiometric mode, the control apparatus performs any one of a first operation to operate a variable valve apparatus so as to retard the closing timing of an intake valve, a second operation to operate an oil jet apparatus so as to increase an oil jet amount, and a third operation to operate an EGR apparatus so as to increase an EGR amount.

2 Claims, 5 Drawing Sheets

(51) Int. Cl.
  *F01L 1/344* (2006.01)
  *F02F 3/22* (2006.01)
  *F02D 41/00* (2006.01)
  *F02P 5/04* (2006.01)
  *F01P 7/16* (2006.01)
  *F01P 5/10* (2006.01)
  *F01P 3/02* (2006.01)
  *F01L 1/047* (2006.01)
  *F01L 1/053* (2006.01)
  *F01L 1/12* (2006.01)
  *F01L 1/18* (2006.01)
  *F01L 1/26* (2006.01)
  *F01L 1/34* (2006.01)
  *F02P 5/152* (2006.01)

(52) U.S. Cl.
  CPC ............... *F01L 1/12* (2013.01); *F01L 1/18* (2013.01); *F01L 1/181* (2013.01); *F01L 1/26* (2013.01); *F01L 1/34* (2013.01); *F01L 1/344* (2013.01); *F01P 3/02* (2013.01); *F01P 5/10* (2013.01); *F01P 7/165* (2013.01); *F01P 7/167* (2013.01); *F02D 35/027* (2013.01); *F02D 41/0052* (2013.01); *F02F 3/22* (2013.01); *F02P 5/04* (2013.01); *F02P 5/152* (2013.01); *F01L 2001/0476* (2013.01); *F01L 2105/00* (2013.01); *F01P 2003/024* (2013.01); *Y02T 10/46* (2013.01); *Y02T 10/47* (2013.01)

(56) References Cited

U.S. PATENT DOCUMENTS

| | | |
|---|---|---|
| 2004/0065275 A1 | 4/2004 | Hayami et al. |
| 2008/0127933 A1* | 6/2008 | Blumberg ............... F02B 11/00 123/304 |
| 2013/0179050 A1* | 7/2013 | Munshi ................ F02B 43/10 701/104 |
| 2015/0167578 A1* | 6/2015 | Hotta ................ F02D 41/3035 701/104 |

FOREIGN PATENT DOCUMENTS

| | | |
|---|---|---|
| JP | 2003-239747 A | 8/2003 |
| JP | 2003239742 A | 8/2003 |
| JP | 2004156490 A | 6/2004 |
| JP | 2009144540 A | 7/2009 |
| JP | 2009191661 A | 8/2009 |
| JP | 2010084621 A | 4/2010 |
| JP | 2011-149313 A | 8/2011 |
| JP | 2011179421 A | 9/2011 |
| JP | 2013119832 A | 6/2013 |
| JP | 2016006305 A | 1/2016 |

* cited by examiner

INTERNAL COMBUSTION ENGINE

CROSS-REFERENCE TO RELATED APPLICATION

This application is based on and claims the benefit of Japanese Patent Application No. 2016-063500, filed on Mar. 28, 2016, which is incorporated by reference herein in its entirety.

BACKGROUND

Field of the Disclosure

The present disclosure relates to an internal combustion engine, and more particularly to an internal combustion engine that, in accordance with an operating region, switches between a stoichiometric mode in which the engine performs operation at the theoretical air-fuel ratio, and a lean mode in which the engine performs operation at an air-fuel ratio that is leaner in fuel than the theoretical air-fuel ratio.

Background Art

JP 2003-239747A discloses a technique to suppress knocking. According to the technique disclosed in JP 2003-239747A, a knocking index that indicates easiness in the occurrence of knocking in an internal combustion engine is stored in association with operating conditions, and the flow rate of cooling water is controlled based on the knocking index determined in accordance with operating conditions.

Note that, in addition to the above described patent literature, JP 2011-149313A and the like may be mentioned as examples of literature describing the state-of-the-art at the time of filing the present application.

SUMMARY OF THE DISCLOSURE

By the way, the wall surface temperature of the intake side of a combustion chamber is prevented from rising by low temperature intake air flowing through an intake port. In contrast, the wall surface temperature of the exhaust side of the combustion chamber is easy to rise because exhaust gas flowing through an exhaust port has a high temperature. Thus, preventing the wall surface temperature of the exhaust side of the combustion from rising is particularly necessary for suppressing knocking. To that end, it is required that the temperature of cooling water flowing through the exhaust side of an engine head is managed appropriately.

The temperature of the cooling water flowing through the exhaust side of the engine head has an optimal value for every operation mode of the internal combustion engine. In a stoichiometric mode in which the operation is performed at the theoretical air-fuel ratio, an optimal temperature is a temperature with which knocking is suppressed. However, in a lean mode in which operation is performed at an air-fuel ratio that is leaner in fuel than the theoretical air-fuel ratio, it is required to decrease the amount of unburned HC emitted from the internal combustion engine rather than to suppress knocking. The reason is that the temperature of exhaust gas does not become high because the combustion temperature in the lean mode is low and thereby the purification performance of a catalyst is hard to be satisfactorily obtained. The optimal temperature of cooling water for decreasing the emission of unburned HC is lower than the optimal temperature of cooling water for suppressing knocking. Therefore, it is preferable that the cooling water temperature (temperature of the cooling water flowing through the exhaust side of the engine head) in the lean mode is made higher than the cooling water temperature in the stoichiometric mode.

If making a difference in the cooling water temperature between the lean mode and the stoichiometric mode as above, it is necessary to vary the cooling water temperature in accordance with the change of the operation mode. At this time, raising the cooling water temperature can be accomplished immediately, but lowering the cooling water temperature needs time. Thus, at the time of switching from the lean mode to the stoichiometric mode, knocking is likely to occur by the delay of the reduction in the cooling water temperature.

The present disclosure has been conceived in view of the above described problem, and an object of the present disclosure is to provide an internal combustion engine that, in accordance with switching from the lean mode to the stoichiometric mode, can vary the temperature of cooling water from an optimal temperature for the lean mode to an optimal temperature for the stoichiometric mode while suppressing knocking.

An internal combustion engine according to the present disclosure is an internal combustion engine which switches between a stoichiometric mode in which operation is performed at a theoretical air-fuel ratio and a lean mode in which operation is performed at an air-fuel ratio that is leaner in fuel than the theoretical air-fuel ratio, and which includes the apparatuses described hereunder.

The internal combustion engine according to the present disclosure includes: a variable valve apparatus that is capable of varying a closing timing of a intake valve; an oil jet apparatus that jets oil toward a back face of a piston; an EGR apparatus that recirculates a part of exhaust gas to an intake passage; an engine water temperature adjustment apparatus that adjusts a temperature of cooling water that flows through an exhaust side of an engine head; and a control apparatus that operates at least the variable valve apparatus, the oil jet apparatus, the EGR apparatus and the engine water temperature adjustment apparatus. The control apparatus is configured to operate the engine water temperature adjustment apparatus so that the temperature of cooling water that passes through the engine head enters a first temperature region when the internal combustion engine operates in the lean mode, and to operate the engine water temperature adjustment apparatus so that the temperature of cooling water that passes through the engine head enters a second temperature region that is a lower temperature region than the first temperature region when the internal combustion engine operates in the stoichiometric mode. Further, the control apparatus is configured to perform any one of a first operation to operate the variable valve apparatus so as to retard the closing timing of the intake valve, a second operation to operate the oil jet apparatus so as to increase an oil jet amount, and a third operation to operate the EGR apparatus so as to increase an EGR amount when knocking is detected after switching is started from the lean mode to the stoichiometric mode.

According to this configuration, the temperature of cooling water that passes through the engine head is lowered in accordance with switching from the lean mode to the stoichiometric mode, and even if knocking occurs at that time, knocking is suppressed by any one of the first to third operations being performed. Specifically, when the first operation is performed, an actual compression ratio is lowered by retarding the closing timing of the intake valve, and thereby a cylinder temperature is decreased. As a result, knocking is suppressed. When the second operation is performed, cooling of the piston and the cylinder wall surface on which the piston slides is enhanced by the amount of oil jetted toward the back face of the piston being increased, and thereby knocking is suppressed. When the third operation is performed, combustion is slowed down by the EGR amount being increased, and thereby knocking is suppressed.

The first temperature region may be a temperature region defined by an error range centering on a first temperature, and the error may be set as zero. The second temperature region may be a temperature region in which a second temperature that is a lower temperature than the first temperature is set as an upper limit. Hence, the control apparatus may be configured to operate the engine water temperature adjustment apparatus so that the temperature of cooling water that passes through the engine head becomes the first temperature when the internal combustion engine operates in the lean mode, and to operate the engine water temperature adjustment apparatus so that the temperature of cooling water that passes through the engine head becomes equal to or less than the second temperature that is a lower temperature than the first temperature when the internal combustion engine operates in the stoichiometric mode.

The control apparatus may be configured to perform any one of the other two operations when knocking is still detected after having performed one operation of the first to third operations as above. That is, when knocking has not been fully suppressed by performing one operation, another operation may be performed in addition. For example, when knocking is detected after the first operation has been performed, the second operation or the third operation may be performed. According to this, degradation in fuel economy performance is suppressed in comparison with a case where two operations are performed at the same time from the beginning.

Further, the control apparatus may be configured to perform a last operation when knocking is still detected after having performed two operations of the first to third operations as above. That is, when knocking has not been fully suppressed by performing two operations, a last operation may be performed in addition. For example, when knocking is detected after the first operation has been performed, the second operation may be performed, and when knocking is still detected after the second operation has been performed, the third operation may be performed further. According to this, degradation in fuel economy performance is suppressed in comparison with a case where multiple operations are performed at the same time from the beginning.

Further, the control apparatus may be configured to retard an ignition timing from a MBT ignition timing when knocking is still detected after having performed all the operations of the first to third operations. That is, when knocking has not been fully suppressed by performing all the operations, an ignition timing may be retarded from a MBT ignition timing. According to this, knocking is surely suppressed at last, and degradation in fuel economy performance is suppressed in comparison with a case where an ignition timing is retarded from the beginning.

However, if suppressing knocking has a high priority, retarding an ignition timing from a MBT ignition timing may be selected when knocking is still detected after having performed two operations of the first to third operations. If suppressing knocking has a very high priority, retarding an ignition timing from a MBT ignition timing may be selected when knocking is still detected after having performed one operation of the first to third operations.

As described above, according to the internal combustion engine of the present disclosure, it is possible, in accordance with switching from the lean mode to the stoichiometric mode, to vary the temperature of cooling water from an optimal temperature for the lean mode to an optimal temperature for the stoichiometric mode while suppressing knocking.

DETAILED DESCRIPTION

Embodiments of the present disclosure are described hereunder with reference to the accompanying drawings.

1. Overall Configuration of Internal Combustion Engine

Figure 1:
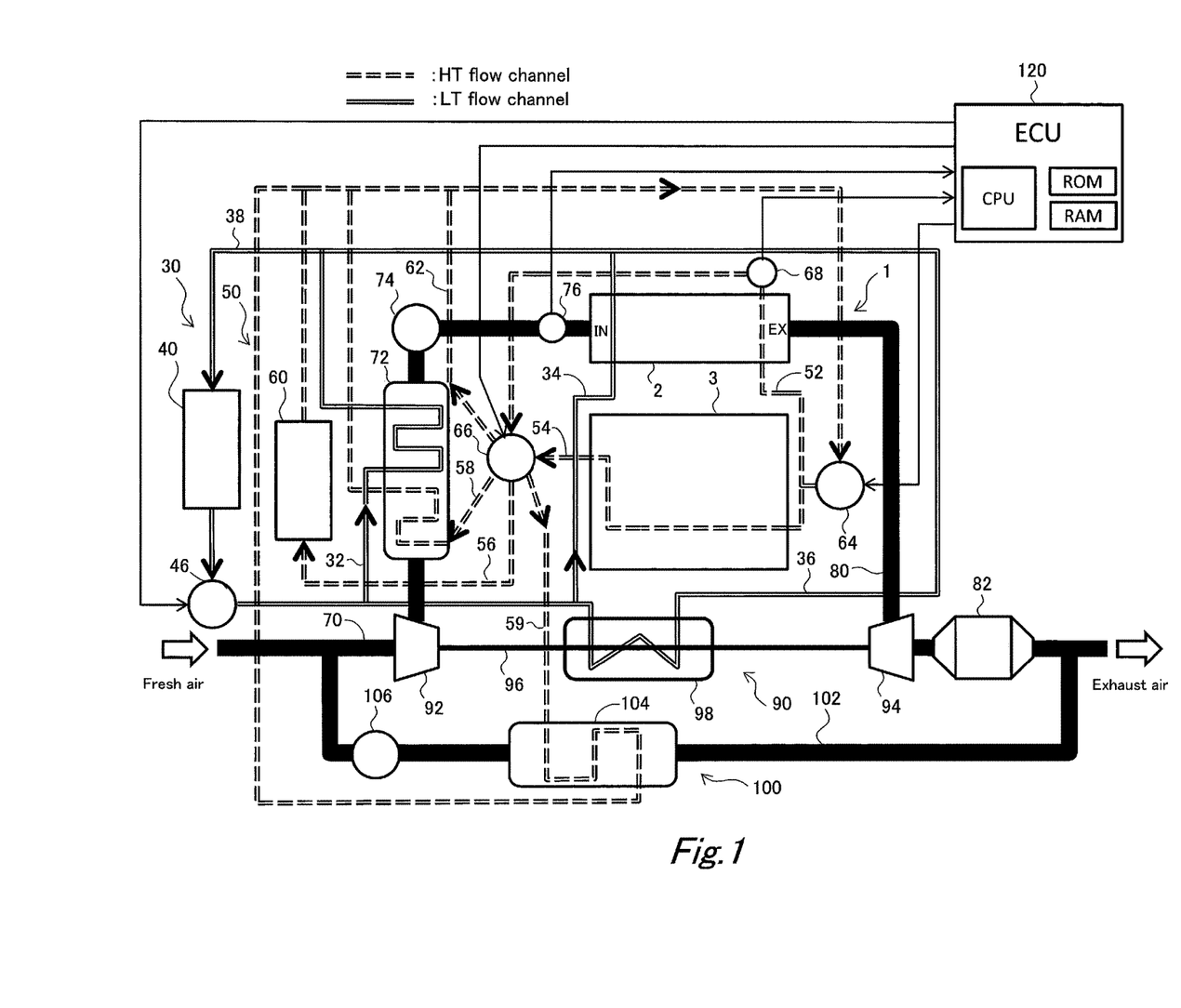
FIG. 1 is a conceptual diagram illustrating the overall configuration of an internal combustion engine of an embodiment.

FIG. 1 is a conceptual diagram illustrating the overall configuration of an internal combustion engine of an embodiment. An internal combustion engine (hereunder, referred to simply as "engine") 1 includes an engine block 3, and an engine head 2 that is arranged via an unshown gasket on the engine block 3.

An intake passage 70 and an exhaust passage 80 are connected to the engine head 2. A compressor 92, an intercooler 72 and an electronically controlled throttle 74 are arranged in that order in the intake passage 70 from the upstream side thereof towards the engine head 2. In the intake passage 70 on the downstream side relative to the throttle 74, an intake-air temperature sensor 76 is installed for measuring the temperature of intake air that is introduced into the engine head 2. In the exhaust passage 80, a turbine 94 and a three-way catalyst 82 are disposed in that order in the downstream direction from the engine head 2. An unshown NOx storage-reduction catalyst (NSR) and selective reduction catalyst (SCR) are disposed in that order at positions that are further downstream in the exhaust passage 80.

The compressor 92 and the turbine 94 constitute a turbocharger 90. The compressor 92 and the turbine 94 are connected by a rotating shaft 96 that is rotatably supported by a bearing 98 and rotate as one body. Although not illustrated in the drawings, a turbine bypass passage that bypasses the turbine 94 and a waste gate valve that opens and closes the turbine bypass passage are provided in the exhaust passage 80.

The engine 1 includes an EGR apparatus 100 that recirculates some of the exhaust gas from the exhaust passage 80 to the intake passage 70. The EGR apparatus 100 is constituted by an EGR passage 102, an EGR cooler 104 and an EGR valve 106. The EGR passage 102 connects the exhaust passage 80 at a position downstream of the three-way catalyst 82 to the intake passage 70 at a position upstream of the compressor 92. The EGR cooler 104 is provided in the EGR passage 102, and cools exhaust gas (EGR gas) that flows through the EGR passage 102. The EGR valve 106 is provided in the EGR passage 102 at a position that is downstream of the EGR cooler 104 in the direction of the flow of the EGR gas.

The engine 1 includes two cooling systems 30 and 50 which cool the main body and the components of the engine 1. The cooling systems 30 and 50 are each configured as a closed circuit in which cooling water circulates, and the temperature of the cooling water circulating in the cooling system 30 and the temperature of the cooling water circulating in the cooling system 50 can be made to differ from each other. Hereunder, the cooling system 30 in which cooling water of a comparatively low temperature is circulated is referred to as "LT cooling system", and the cooling system 50 in which cooling water of a comparatively high temperature is circulated is referred to as "HT cooling system". Further, cooling water that circulates through a circuit in the LT cooling system 30 is referred to as "LT cooling water", and cooling water that circulates through a circuit in the HT cooling system 50 is referred to as "HT cooling water". In FIG. 1, flow channels (hereunder, referred to as "LT flow channels") for LT cooling water which constitute the LT cooling system 30 are depicted with double lines, and flow channels (hereunder, referred to as "HT flow channels") for HT cooling water which constitute the HT cooling system 50 are depicted with double broken lines. Note that "LT" is an abbreviation of "low temperature" and "HT" is an abbreviation of "high temperature".

The LT cooling system 30 includes a first LT flow channel 32 to a fourth LT flow channel 38 that constitute a circulation circuit for the LT cooling water, and an electric water pump 46 for causing the LT cooling water to circulate. The first LT flow channel 32 passes through the inside of the intercooler 72, the second LT flow channel 34 passes though the intake side in the engine head 2, and the third LT flow channel 36 passes though the bearing 98 of the turbocharger 90. Both ends of each of the first LT flow channel 32 to third LT flow channel 36 are connected in parallel to both ends of the fourth LT flow channel 38. A radiator 40 is disposed in the fourth LT flow channel 38. The fourth LT flow channel 38 forms a circuit in which LT cooling water circulates with each of the first LT flow channel 32 to the third LT flow channel 36. The electric water pump 46 is provided downstream of the radiator 40 in the fourth LT flow channel 38. The discharge rate of the electric water pump 46, that is, the flow rate of LT cooling water circulating in the circuit, can be arbitrarily changed by adjusting the output of a motor.

The LT cooling water that flows through the first LT flow channel 32 exchanges heat inside the intercooler 72 with intake air that passes through the intercooler 72. The second LT flow channel 34 is provided so as to pass through the vicinity of an intake port (preferably so as to surround the intake port) of each cylinder in the engine head 2. The LT cooling water that flows through the second LT flow channel 34 exchanges heat through the engine head 2 with intake air that passes through the intake ports. If the temperature of the LT cooling water is lower than the temperature of the intake air, the intake air is cooled by the heat exchange, while if the temperature of the LT cooling water is higher than the temperature of the intake air, the intake air is heated by the heat exchange. Thus, the temperature of intake air that enters a combustion chamber is adjusted in accordance with the temperature of the LT cooling water by the heat exchange at these sites. The LT cooling water that flows through the third LT flow channel 36 exchanges heat with the bearing 98 of the turbocharger 90, and thereby suppresses overheating of the bearing 98.

Note that, although in the present embodiment the first LT flow channel 32 and the second LT flow channel 34 are connected in parallel, the first LT flow channel 32 and the second LT flow channel 34 may be connected in series. That is, a flow channel may be provided so that LT cooling water that passed through the intercooler 72 passes though the intake side in the engine head 2. Similarly, the third LT flow channel 36 that passes through the bearing 98 also may be connected in series with the first LT flow channel 32 or the second LT flow channel 34.

The HT cooling system 50 includes a first HT flow channel 52 to a sixth HT flow channel 62 that constitute a circulation circuit for HT cooling water, an electric water pump 64 for causing HT cooling water to circulate, and a multifunction valve 66 for controlling the flow of the HT cooling water inside the circulation circuit. The first HT flow channel 52 passes through the exhaust side inside the engine head 2, and the second HT flow channel 54 passes through the inside of the engine block 3. The first HT flow channel 52 and the second HT flow channel 54 are respectively connected to separate intake ports of the multifunction valve 66.

The multifunction valve 66 has two intake ports and four discharge ports. The configuration of the multifunction valve 66 will be described in detail later. The third HT flow channel 56 to the sixth HT flow channel 62 are connected to the four discharge ports of the multifunction valve 66. A radiator 60 is disposed in the third HT flow channel 56. The fourth HT flow channel 58 passes through the inside of the intercooler 72. The fifth HT flow channel 59 passes through the inside of the EGR cooler 104. The sixth HT flow channel 62 bypasses the radiator 60, the intercooler 72 and the EGR cooler 104. The third HT flow channel 56 to sixth HT flow channel 62 are connected to an intake port of the electric water pump 64. The first HT flow channel 52 and the second HT flow channel 54 are connected to a discharge port of the electric water pump 64. Thus, a circuit in which the HT cooling water circulates is formed by the first HT flow channel 52 and the second HT flow channel 54, and by the third HT flow channel 56 to sixth HT flow channel 62. The flow rate of HT cooling water circulating inside the circuits can be arbitrarily changed by adjusting the output of a motor of the electric water pump 64.

Among the flow channels forming the circulation circuits for the HT cooling water, the flow channels in which heat exchange is performed with the main body or components of the engine 1 are the first HT flow channel 52, the second HT flow channel 54, the fourth HT flow channel 58 and the fifth HT flow channel 59. The first HT flow channel 52 is provided so as to pass through the vicinity of the wall surface on the exhaust side of the combustion chamber of each cylinder in the engine head 2. In contrast to the aforementioned second LT flow channel 34 which is locally provided in the vicinity of the intake ports, the first HT flow channel 52 is provided so as to pass through the entire engine head 2 and finally exit to outside of the engine head 2 from the exhaust side. An engine water temperature sensor 68 for measuring the temperature of HT cooling water at an outlet from the engine head 2 is provided in the outlet of the first HT flow channel 52 from the engine head 2. A temperature that is measured by the engine water temperature sensor 68 corresponds to the wall surface temperature on the exhaust side of the combustion chamber. The second HT flow channel 54 constitutes a principal part of a water jacket surrounding the peripheral walls of cylinders formed in the engine block 3 and performs overall cooling with respect to the peripheral walls of the cylinders. The fourth HT flow channel 58 exchanges heat inside the intercooler 72 with intake air that passes through the intercooler 72. In contrast to the aforementioned first LT flow channel 32 which is provided on the downstream side in the flow direction of intake air inside the intercooler 72, the fourth HT flow channel 58 is provided on the upstream side in the flow direction of the intake air inside the intercooler 72. That is, in the intercooler 72, first, heat exchange is performed between the HT cooling water and intake air, and next heat exchange is performed between the LT cooling water and the intake air. The fifth HT flow channel 59 exchanges heat inside the EGR cooler 104 with EGR gas that passes through the EGR cooler 104.

The multifunction valve 66 regulates a ratio between the flow rates of HT cooling water flowing into the two intake ports, that is, a ratio between the HT cooling water flowing through the first HT flow channel 52 and the HT cooling water flowing through the second HT flow channel 54, based on the temperature of the HT cooling water in the circulation circuit (the engine water temperature measured by the engine water temperature sensor 68). For example, at a time of cold starting when the temperature of the HT cooling water is low, the multifunction valve 66 cuts off circulation of HT cooling water through the second HT flow channel 54 that passes through the engine block 3, and allows only the circulation of HT cooling water through the first HT flow channel 52 that passes through the engine head 2. Further, the multifunction valve 66 regulates a ratio between the flow rates of HT cooling water flowing out from the four discharge ports, that is, the ratio between the HT cooling water flowing through the third HT flow channel 56, the HT cooling water flowing through the fourth HT flow channel 58, the HT cooling water flowing through the fifth HT flow channel 59 and the HT cooling water flowing through the sixth HT flow channel 62, based on the temperature of the HT cooling water. For example, at a time of cold starting when the temperature of the HT cooling water is low, the multifunction valve 66 cuts off circulation through the third HT flow channel 56 in which the radiator 60 is disposed, and causes the HT cooling water to circulate through the fourth HT flow channel 58 or sixth HT flow channel 62.

The engine 1 includes a control apparatus 120. The control apparatus 120 controls operation of the engine 1 by controlling various apparatuses and actuators included in the engine 1. The control apparatus 120 is an ECU (electronic control unit) having at least one CPU, at least one ROM and at least one RAM. However, the control apparatus 120 may be constituted by a plurality of ECUs. Various functions relating to engine control are realized in the control apparatus 120 by loading a program that is stored in the ROM to the RAM, and executing the program with the CPU.

2. Operation of Cooling Systems

The objects of operation by the control apparatus 120 include the two cooling systems 30 and 50. Operations of the two cooling systems 30 and 50 are performed to control the temperature of intake air that is supplied from the intake passage 70 to the engine head 2 and enters the combustion chambers. That is, the control apparatus 120 operates the cooling systems 30 and 50 by taking the temperature of intake air entering a combustion chamber as a first controlled variable (state quantity to be controlled).

Specifically, when the intake air temperature is a high temperature, such as during turbocharging by the turbocharger 90, the control apparatus 120 operates the cooling systems 30 and 50 so as to cool the intake air by means of the intercooler 72. More specifically, the control apparatus 120 operates the electric water pump 46 of the LT cooling system 30 so as to adjust the flow rate of the LT cooling water that flows through the first LT flow channel 32, and also operates the multifunction valve 66 of the HT cooling system 50 so as to cut off circulation to the fourth HT flow channel 58 of HT cooling water that has a high temperature (HT cooling water which was not cooled at the radiator 60) that flowed out from the engine head 2 or the engine block 3. By these operations, the amount of cooling of the intake air that passes through the intercooler 72 is increased or decreased in accordance with an increase or decrease in the flow rate of the LT cooling water flowing through the first LT flow channel 32, thereby adjusting the temperature of the intake air. Note that, when passing through the intake port in the engine head 2, the intake air that was cooled at the intercooler 72 is also cooled by heat exchange with LT cooling water flowing through the second LT flow channel 34.

Conversely, when the intake air temperature is low, such as at a time of cold starting, the control apparatus 120 operates the multifunction valve 66 of the HT cooling system 50 so as to allow circulation of HT cooling water to the fourth HT flow channel 58. Intake air that passes through the intercooler 72 is heated by the HT cooling water having a high temperature that flows through the fourth HT flow channel 58, and intake air whose temperature was increased by being heated in that manner flows out from the intercooler 72. Further, as operation with respect to the LT cooling system 30, the control apparatus 120 stops the electric water pump 46 to cut off the flow of LT cooling water (LT cooling water having a low temperature that was cooled at the radiator 40) to the first LT flow channel 32. By these operations, the amount of heating of the intake air that passes through the intercooler 72 is increased or decreased in accordance with an increase or decrease in the flow rate of the HT cooling water flowing through the fourth HT flow channel 58, thereby adjusting the temperature of the intake air.

Further, the control apparatus 120 also performs operation of the HT cooling system 50 taking the temperature of cooling water flowing through the exhaust side of the engine head 2 (hereunder, this temperature is also referred to as "engine water temperature") as a second controlled variable. The temperature of the cooling water flowing through the exhaust side of the engine head 2 is represented by a temperature measured by the engine water temperature sensor 68 provided at the outlet of the engine head 2. If there is a difference between the temperature measured by the engine water temperature sensor 68 and a target temperature, the control apparatus 120 operates the electric water pump 64 to adjust the flow rate of HT cooling water flowing through the first HT flow channel 52, and also operates the multifunction valve 66 to adjust the ratio of the HT cooling water that flows to the third HT flow channel 56 and is cooled at the radiator 60. By these operations, the temperature of cooling water that flows through the exhaust side of the engine head 2 is adjusted in accordance with an increase or decrease in the flow rate of the HT cooling water flowing through the first HT flow channel 52 or in accordance with an increase and decrease in the ratio of HT cooling water that is cooled at the radiator 60.

As described in the foregoing, in the engine 1, operation of the HT cooling system 50 is performed by taking the temperature of cooling water that flows through the exhaust side of the engine head 2 as a controlled variable. This operation relates to operation with respect to an "engine water temperature adjustment apparatus" described in claim 1 of the present application. In this embodiment, the HT cooling system 50 corresponds to the "engine water temperature adjustment apparatus" described in claim 1.

3. Configuration Around Combustion Chamber

Figure 2:
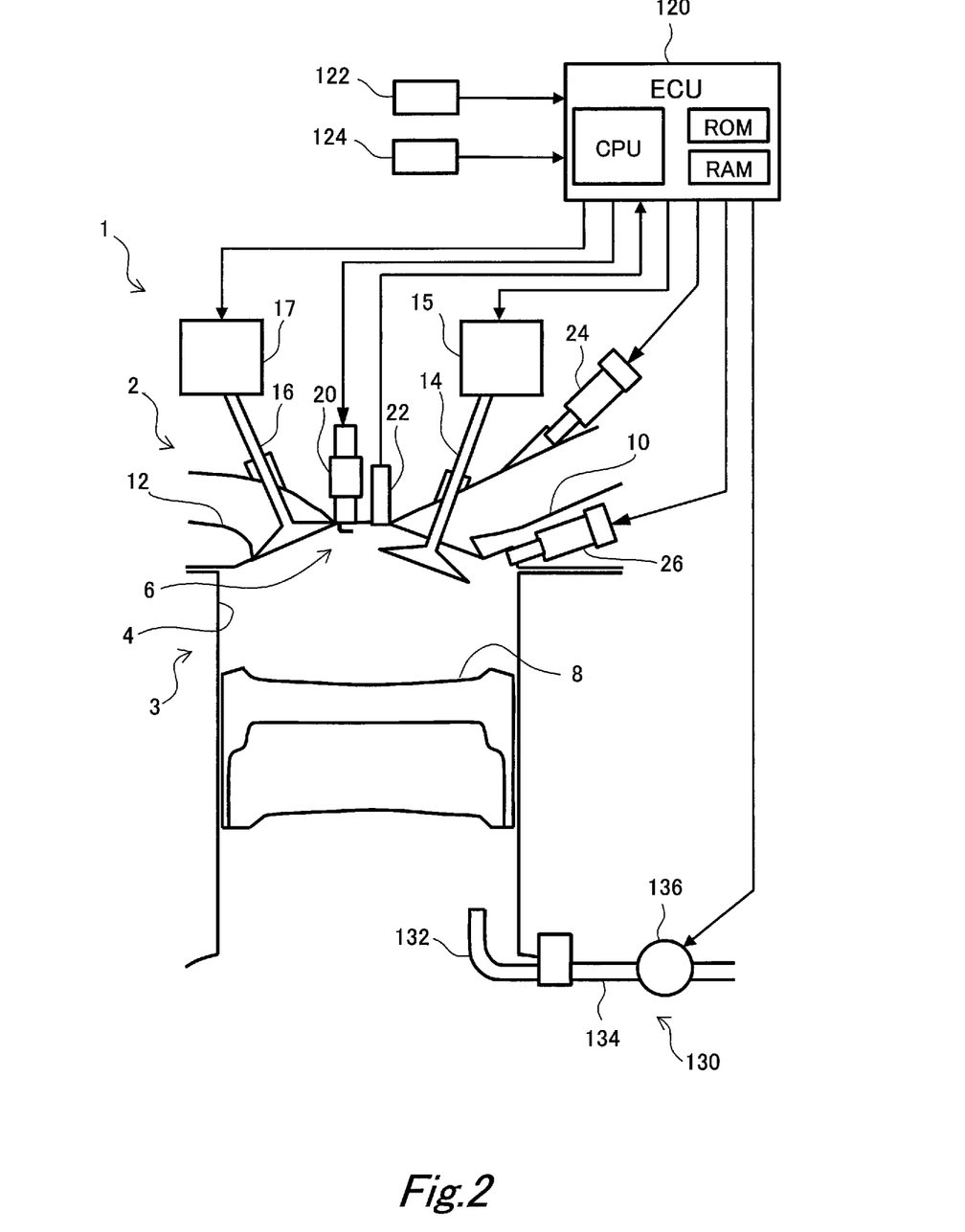
FIG. 2 is a view that illustrates the configuration around a combustion chamber of the internal combustion engine of the embodiment.

Next, the configuration around a combustion chamber of the engine 1 will be described using FIG. 2. In FIG. 2, components constituting the engine 1 are illustrated in a manner in which the components are projected onto a single plane that is perpendicular to a crankshaft. The engine 1 is a spark-ignition multi-cylinder engine that has a plurality of cylinders 4. The number and arrangement of the cylinders 4 is not limited. In each of the cylinders 4 of the engine block 3, a piston 8 is arranged that reciprocates in the axial direction thereof. A pent-roof shaped combustion chamber 6 that is an upper space of the cylinder 4 is formed on the underside of the engine head 2.

An intake port 10 and an exhaust port 12 that communicate with the combustion chamber 6 are formed in the engine head 2. An intake valve 14 is provided at an opening portion that allows the intake port 10 to communicate with the combustion chamber 6. An exhaust valve 16 is provided at an opening portion that allows the exhaust port 12 to communicate with the combustion chamber 6. The intake valve 14 is driven by a variable valve apparatus (hereunder, referred to as "IN-VVT") 15 that is capable of changing valve opening characteristic thereof. The exhaust valve 16 is driven by a variable valve apparatus (hereunder, referred to as "EX-VVT") 17 that is capable of changing valve opening characteristic thereof. The IN-VVT 15 is designed to vary at least the closing timing (hereunder, referred to as "IVC") of the intake valve 14 by varying the valve-timing thereof or varying the operating angle thereof. There is no limitation with regard to the method of changing the valve opening characteristic by the EX-VVT 17.

Although not illustrated in the drawing, the intake port 10 bifurcates partway along its length in the direction from an inlet formed in a side face of the engine head 2 towards the opening portion that communicates with the combustion chamber 6. A port injection valve 24 that injects fuel into the intake port 10 is provided upstream of a portion at which the intake port 10 bifurcates. At a lower part of the intake port 10 which is a location between the bifurcating parts of the intake port 10, an in-cylinder injection valve 26 that injects fuel into the combustion chamber 6 is provided so that the tip thereof faces the combustion chamber 6. Further, a spark plug 20 and a combustion pressure sensor 22 for measuring a combustion pressure are provided in the vicinity of the top portion of the combustion chamber 6.

An oil jet nozzle 132 of an oil jet apparatus 130 is installed in the engine block 3. The position and angle of the oil jet nozzle 132 are adjusted so that oil is jetted toward the back face of the piston 8. An oil gallery 134 that supplies oil that is pumped up by an unshown oil pump to the oil jet nozzle 132 is connected to the oil jet nozzle 132. The oil gallery 134 is provided with an oil control valve (OCV) 136 that controls the amount of oil jetted from the oil jet nozzle 132 (amount per unit time, hereunder, referred to as "oil jet amount").

The engine 1 is an engine that is capable of switching between operation in a lean mode and operation in a stoichiometric mode. In the lean mode, operation is performed according to an air-fuel ratio that is lean in fuel (for example, an air-fuel ratio of around 25), that is operation using lean combustion, by port injection with which an air-fuel mixture having a high degree of homogeneity is obtained, or by a combination of port injection and in-cylinder injection that primarily uses the port injection. More specifically, lean combustion that is realized with the engine 1 is not stratified lean combustion which forms an air-fuel mixture layer with a high fuel concentration at the periphery of the spark plug 20, but rather is homogeneous lean combustion which distributes an air-fuel mixture with a homogeneous fuel concentration throughout the combustion chamber 6. Further, in the lean mode, introduction of EGR gas is not performed by the EGR apparatus 100, and lean combustion is performed that uses only fresh air. In the stoichiometric mode, operation according to the theoretical air-fuel ratio is performed, that is, operation is performed under stoichiometric combustion, by in-cylinder injection or by a combination of port injection and in-cylinder injection that primarily uses the in-cylinder injection. However, the term "operation according to the theoretical air-fuel ratio" does not mean that the air-fuel ratio under which operation is performed is necessarily always the exact theoretical air-fuel ratio. In the present description, operation in which the operational air-fuel ratio deviates somewhat to the rich side or lean side relative to the theoretical air-fuel ratio and operation in which the operational air-fuel ratio fluctuates with small amplitude around the theoretical air-fuel ratio are included in the meaning of the term "operation according to the theoretical air-fuel ratio". The stoichiometric mode is selected in an operating region in which the load is high relative to an operating region in which the lean mode is selected. Further, in the stoichiometric mode of the present embodiment, EGR is executed by the EGR apparatus 100. Therefore, in the following description, the stoichiometric mode in which EGR is executed is, in particular, referred to as "stoichiometric EGR mode" to distinguish the mode from the lean mode in which EGR is not executed.

Operations of the apparatuses and actuators for realizing the lean mode and the stoichiometric EGR mode are performed by the control apparatus 120. Combustion pressure data obtained by the combustion pressure sensor 22 is taken in by the control apparatus 120. The combustion pressure data is used together with crank angle signals taken in from a crank angle sensor 122 to perform fuel injection amount control and ignition timing control that are described next. Also, a knocking sensor 124 is connected to the control apparatus 120. The knocking sensor 124 is installed on the engine block 3 and detect a knocking signal (signal of particular frequency that appears when knocking occurred). The knocking signal that is detected by the knocking sensor 124 is used for knocking control for suppressing knocking. However, the knocking sensor 124 is not necessarily required. Knocking can be detected from combustion pressure data obtained by the combustion pressure sensor 22, and the knocking detected from the combustion pressure data can be used for knocking control. The detail of knocking control will be described later. Note that, when the control apparatus 120 is constituted by a plurality of ECUs, an ECU that performs fuel injection amount control or ignition timing control may be a separate ECU from an ECU that performs intake air temperature control or engine water temperature control that are described above. Also, an ECU that performs knocking control may be a separate ECU from those ECUs

4. Fuel Injection Amount Control and Ignition Timing Control Based on Combustion Pressure Data During operation in the lean mode, the control apparatus 120 performs fuel injection amount control and ignition timing control based on combustion pressure data obtained by the combustion pressure sensor 22. Hereunder, the details of the control are described using FIG. 3.

Figure 3:
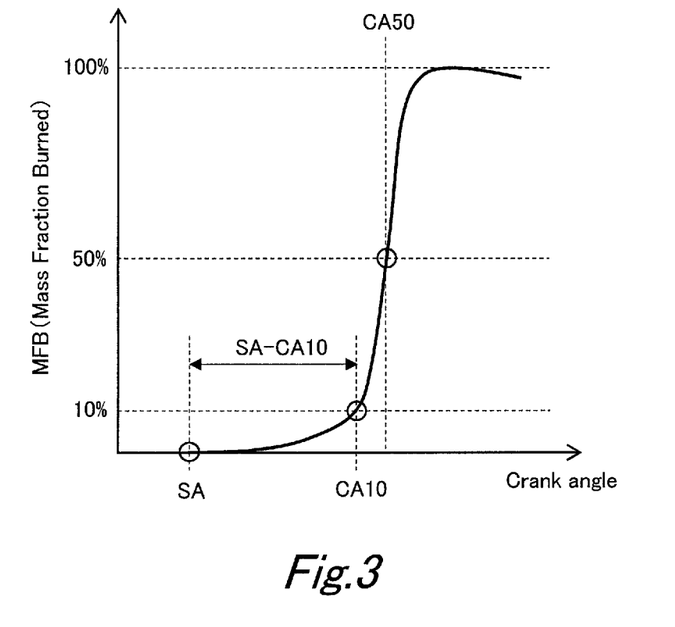
FIG. 3 is a view for describing fuel injection amount control and ignition timing control of the embodiment.

The control apparatus 120 calculates a heat release quantity Q in a cylinder at an arbitrary crank angle θ in accordance with expression (1) using in-cylinder pressure data obtained by the combustion pressure sensor 22. Where, in expression (1), P represents an in-cylinder pressure, V represents an in-cylinder volume and κ represents a ratio of specific heat of in-cylinder gas. Further, $P_0$ and $V_0$ represent an in-cylinder pressure and an in-cylinder volume, respectively, at a calculation starting point $\theta_0$ (a predetermined crank angle during a compression stroke that is defined so as to include a margin with respect to an assumed combustion starting point).

$$Q = \int PdV + \frac{1}{\kappa - 1}(PV - P_0V_0) \quad (1)$$

After the heat release quantity Q has been calculated at each crank angle θ of a predetermined crank angle period that includes a combustion period, next a mass fraction burned (hereunder, referred to as "MFB") at an arbitrary crank angle θ is calculated in accordance with expression (2). Where, in expression (2), $\theta_{sta}$ represents a combustion starting point and $\theta_{fin}$ represents a combustion ending point.

$$MFB = \frac{Q(\theta) - Q(\theta_{Sta})}{Q(\theta_{fin}) - Q(\theta_{sta})} \quad (2)$$

FIG. 3 is a view that illustrates a waveform of MFB with respect to the crank angles calculated according to the above described expression (2). A crank angle period until a crank angle CA10 at which MFB becomes 10% (hereunder, this period is referred to as "SA-CA10") after ignition of an air-fuel mixture is performed at an ignition timing SA is a parameter that represents an ignition delay, and it is known that there is a high correlation between SA-CA10 and the air-fuel ratio of the air-fuel mixture that is combusted (particularly, a limit air-fuel ratio at which lean combustion is possible). If the fuel injection amount is subjected to feedback control so that SA-CA10 becomes a target value, the air-fuel ratio can be naturally brought close to the target air-fuel ratio (lean limit air-fuel ratio). In the fuel injection amount control by the control apparatus 120, the actual SA-CA10 is calculated based on the MFB waveform, and the fuel injection amount is corrected based on a difference between a target SA-CA10 and the actual SA-CA10. Note that, because the time period per crank angle changes when the engine speed changes, preferably the target SA-CA10 is set in accordance with the engine speed at least.

A crank angle CA50 at a time at which the MFB becomes 50% corresponds to the combustion center of gravity position. The crank angle CA50 changes depending on the ignition timing SA. If CA50 matches the combustion center of gravity position at a time that the torque that is realized is the maximum torque, it can be said that the ignition timing SA at such time is the MBT. In the ignition timing control by the control apparatus 120, the actual CA50 is calculated based on the MFB waveform, and the basic ignition timing is corrected based on a difference between the target CA50 and the actual CA50. The target CA50 is also preferably set in accordance with at least the engine speed.

As described in the foregoing, according to the present embodiment, SA-CA10 and CA50 are calculated based on combustion pressure data obtained by the combustion pressure sensor 22, and fuel injection amount control is performed based on SA-CA10, and ignition timing control is performed based on CA50. Note that, although fuel injection amount control based on SA-CA10 can be performed regardless of the operation mode, in the present embodiment the fuel injection amount control based on SA-CA10 is performed during operation in the lean mode. During operation in the stoichiometric EGR mode, air-fuel ratio feedback control is performed based on the output of an unshown air-fuel ratio sensor or oxygen concentration sensor.

5. Intake Air Temperature Control and Engine Water Temperature Control

Fuel injection amount control based on SA-CA10 is based on the premise that there is a strong correlation between SA-CA10 and the air-fuel ratio. However, the temperature of intake air that enters the combustion chamber 6 has an influence on the relation between SA-CA10 and the air-fuel ratio. Therefore, it is required to make the intake air temperature constant in order to ensure the accuracy of fuel injection amount control based on SA-CA10. However, since the intake air temperature is itself a parameter that influences combustion, it is not the case that the intake air temperature that is adopted as a target may be any temperature. Further, the engine water temperature (temperature of cooling water that flows through the exhaust side of the engine head 2) that is a controlled variable of the engine water temperature control is also a parameter that influences combustion. Hence, it is preferable that there are no fluctuations in the engine water temperature also, similarly to the intake air temperature.

Tasks that exist with respect to the lean mode and the stoichiometric EGR mode when considering the setting of the intake air temperature and engine water temperature that are to be adopted as targets are summarized and described hereunder.

At least the following three tasks exist with respect to the lean mode. The first task is to improve the robustness of combustion. This task arises due to the fact that because the fuel concentration in the air-fuel mixture is low overall in homogeneous lean combustion, in comparison to stoichiometric combustion or stratified lean combustion, many constraints exist with regard to disturbance in terms of maintaining combustion. The second task is to reduce the generation of unburned hydrocarbons. This task arises due to the fact that because the combustion temperature in lean combustion is low compared to stoichiometric combustion, unburned hydrocarbons are liable to be generated from the quench area of the combustion chamber 6. The third task is to increase the upper-limit air amount. To further improve fuel consumption performance, it is required to increase the upper-limit air amount and expand the operation region of the lean mode to the high load side.

At least the following three tasks exist with respect to the stoichiometric EGR mode. The first task is to improve the robustness of combustion. This task arises due to the fact that, in the stoichiometric EGR mode, if a large amount of EGR gas is introduced to improve fuel consumption, combustion is liable to become unstable since there are fluctuations in the EGR amount that is introduced between each cycle. The second task is to suppress the generation of condensed water caused by condensation of water vapor that is contained in EGR gas. This task arises due to the fact that because sulfur components and hydrocarbon components are contained in EGR gas, condensed water acidifies if these components melt in the condensed water, and there is a concern that the condensed water will corrode or deteriorate the engine 1. The third task is to suppress the occurrence of knocking at the time of a high load. This task arises due to the fact that when the load increases, the compression-end temperature increases and knocking is liable to occur.

As the result of studies conducted while taking the above tasks into consideration, in the present embodiment a configuration is adopted in which the respective target values for the intake air temperature (temperature of intake air entering the combustion chamber 6) and for the engine water temperature (temperature of cooling water flowing through the exhaust side of the engine head 2) in the lean mode and the stoichiometric EGR mode, respectively, are set as described hereunder.

First, setting of a target value of the intake air temperature will be described. Among the above described tasks, the tasks that particularly relate to the intake air temperature in the stoichiometric EGR mode are the first task and second task for the stoichiometric EGR mode, and the tasks that particularly relate to the intake air temperature in the lean mode are the first task and third task for the lean mode. The target value for the intake air temperature in each mode is set to an optimal intake air temperature for comprehensively achieving these tasks.

The optimal intake air temperature of the stoichiometric EGR mode in this embodiment is 45° C. This temperature is a temperature that corresponds to a dew-point temperature in standard operating conditions (these operating conditions include air pressure, outside air temperature, humidity, EGR rate and the like). In the stoichiometric EGR mode the two cooling systems 30 and 50 are operated so that the intake air temperature that is measured by the intake-air temperature sensor 76 is maintained at 45° C. that is the optimal intake air temperature.

The higher that the intake air temperature is in the stoichiometric EGR mode, the better it is in terms of reducing a risk that condensed water will arise. However, the intake efficiency decreases as the intake air temperature increases. By controlling the intake air temperature to the dew-point temperature as described above, the risk of condensed water arising can be suppressed while suppressing a decrease in the intake efficiency to a minimum. However, although the dew-point temperature changes depending on the operating conditions, the target value of the intake air temperature in the stoichiometric EGR mode is fixed to the dew-point temperature under standard operating conditions. That is, even if the dew-point temperature changes, the intake air temperature is not changed in accordance with the dew-point temperature. The reason is that, when a large amount of EGR gas is introduced in the stoichiometric EGR mode and fluctuations in the EGR amount between each cycle affect combustion, if there are also fluctuations in the intake air temperature there is a risk that this will lead to unstable combustion. In short, a configuration is adopted in which the intake air temperature is maintained at a constant temperature even in the stoichiometric EGR mode in order to improve the robustness of combustion. Note that, although preferably the intake air temperature is maintained at exactly the optimal intake air temperature, an error of a certain amount (for example, around 1° C.) with respect to the optimal intake air temperature may be allowed. That is, a configuration may be adopted so as to perform adjustment of the intake air temperature so that the intake air temperature enters a temperature region defined by an error range that is centered on the optimal intake air temperature.

On the other hand, the optimal intake air temperature in the lean mode is a lower temperature than the optimal intake air temperature in the stoichiometric EGR mode. In the lean mode, in which recirculation is not performed, a decrease in combustion stability due to fluctuations in the EGR amount between cycles does not arise. Therefore, intake air of a comparatively low temperature relative to the stoichiometric EGR mode can be supplied into the combustion chambers. In the present embodiment, the optimal intake air temperature in the lean mode is 35° C. In the lean mode, the two cooling systems 30 and 50 are operated so that the intake air temperature measured by the intake-air temperature sensor 76 is maintained at 35° C. that is the optimal intake air temperature.

By maintaining the intake air temperature at the optimal intake air temperature, the accuracy of fuel injection amount control that is based on SA-CA10 can be improved and a deviation in the air-fuel ratio with respect to the target air-fuel ratio can be suppressed. At the same time, the operating region in which operation is performed in the lean mode can be expanded to the high load side by an increase in the upper-limit air amount that is achieved by improving the intake efficiency. Note that, although preferably the intake air temperature is maintained at exactly the optimal intake air temperature, an error of a certain amount (for example, around 1° C.) with respect to the optimal intake air temperature may be allowed. That is, a configuration may be adopted so as to perform adjustment of the intake air temperature so that the intake air temperature enters a temperature region defined by an error range that is centered on the optimal intake air temperature.

Next, setting of a target value of the engine water temperature will be described. Among the above described tasks, the task that particularly relates to the engine water temperature in the stoichiometric EGR mode is the third task for the stoichiometric EGR mode, and the task that particularly relates to the engine water temperature in the lean mode is the second task for the lean mode. The target value for the engine water temperature in each mode is set to an optimal engine water temperature for comprehensively achieving these tasks.

The optimal engine water temperature (first temperature) in the lean mode in this embodiment is 95° C. In the lean mode, the HT cooling system 50 is operated so that the engine water temperature measured by the engine water temperature sensor 68 is maintained at 95° C. that is the optimal engine water temperature.

Since the wall surface temperature of the combustion chamber 6, particularly the wall surface temperature on the exhaust side, can be raised by maintaining the engine water temperature at the optimal engine water temperature, unburned hydrocarbons that are generated from the quench area of the combustion chamber 6 can be reduced. In comparison to stoichiometric combustion, the combustion temperature is low and the exhaust gas temperature does not become high in lean combustion, and consequently it is difficult for a purification function of a catalyst to be exerted adequately. Therefore, it is required to reduce the unburned hydrocarbons themselves that are emitted from the engine 1. Note that, although preferably the engine water temperature is maintained at exactly the optimal engine water temperature, an error of a certain amount (for example, around 1° C.) with respect to the optimal engine water temperature may be allowed. That is, a configuration may be adopted so as to perform adjustment of the engine water temperature so that the engine water temperature enters a temperature region (fourth temperature region) defined by an error range that is centered on the optimal engine water temperature.

On the other hand, although a temperature width exists with respect to the optimal engine water temperature in the stoichiometric EGR mode, the upper limit temperature thereof is a lower temperature than the optimal engine water temperature in the lean mode. In the stoichiometric EGR mode, because the combustion concentration is high and the exhaust gas temperature is also high, even if unburned hydrocarbons are generated from the quench area, the unburned hydrocarbons can be purified by the catalyst which functions adequately. Therefore, cooling water of a comparatively low temperature relative to the lean mode can be caused to flow to the exhaust side of the engine head. The optimal engine water temperature in the stoichiometric EGR mode in the present embodiment is a temperature within a temperature range (second temperature region) that takes 88° C. as an upper limit temperature (second temperature), that is, a temperature equal to or less than 88° C. However, the term "temperature equal to or less than 88° C." does not mean that a temperature which is lower than 88° C. by any amount is allowed, but rather means that although 88° C. is preferable, a temperature that is lower than 88° C. to a certain extent is also allowed. In the lean mode, the HT cooling system 50 is operated so that the engine water temperature measured by the engine water temperature sensor 68 is maintained at a temperature that is equal to or less than 88° C.

The reason that the engine water temperature in the stoichiometric EGR mode is made lower than the engine water temperature in the lean mode is to inhibit the occurrence of knocking. Although unburned hydrocarbons that are generated from the quench area of the combustion chamber 6 are liable to increase when the engine water temperature is lowered, the unburned hydrocarbons can be purified by the adequately functioning catalyst which receives a supply of exhaust gas having a high temperature as the result of undergoing stoichiometric combustion. Note that, although a temperature width is provided with respect to the optimal engine water temperature in the stoichiometric EGR mode, from the viewpoint of improving the robustness of combustion it is preferable to maintain the engine water temperature at a constant temperature.

Figure 4:
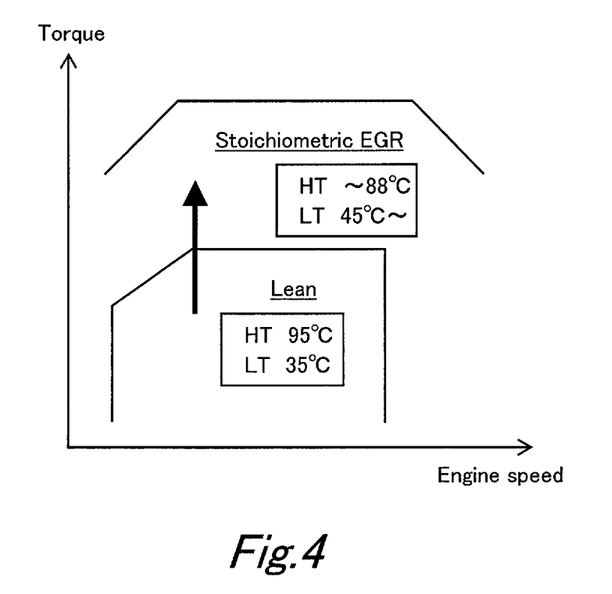
FIG. 4 is a view illustrating an image of a map in which respective target values for intake air temperature and engine water temperature are associated with engine speed and torque.

The foregoing is a description that relates to the respective target values for the intake air temperature and the engine water temperature in each of the lean mode and the stoichiometric EGR mode. The respective target values for the intake air temperature and the engine water temperature which are set as described above are stored in association with the engine speed and torque in a map that is stored in the ROM of the control apparatus 120. FIG. 4 is a view illustrating an image of a map in which respective target values for the intake air temperature and the engine water temperature are associated with the engine speed and torque. In FIG. 4, the temperatures represented by "HT" are target values for the engine water temperature, and the temperatures represented by "LT" are target values for the intake air temperature. The various kinds of control of the engine 1 including the intake air temperature control and the engine water temperature control are performed according to operating regions that are set on a two-dimensional plane that adopts the engine speed and torque as axes.

In FIG. 4, a lean region in which operation according to the lean mode is performed, and a stoichiometric EGR region in which operation according to the stoichiometric EGR mode is performed are set as operating regions of the engine 1. In the lean region, as described above, the target value of the intake air temperature is set to 35° C. and the target value of the engine water temperature is set to 95° C. In the stoichiometric EGR region, the target value of the intake air temperature is set to 45° C. or more and the target value of the engine water temperature is set to 88° C. or less. The term "target value of the intake air temperature is set to 45° C. or more" means that although normally 45° C. is the target value, the intake air temperature is allowed to become higher than 45° C. in a high load region.

The intake air temperature control and the engine water temperature control are executed based on respective target values for the intake air temperature and the engine water temperature that are set as described above.

6. Knocking Control

Next, knocking control for suppressing knocking will be described. Knocking control is performed when knocking is detected from a signal of the knocking sensor 124 or a signal of the combustion pressure sensor 22. The knocking control performed by the control apparatus 120 includes usual knocking control and transient knocking control.

Usual knocking control is performed to bring an ignition timing close to an MBT ignition timing as far as knocking does not occur. That is, usual knocking control is performed to adjust an ignition timing to a trace knock ignition timing. In usual knocking control, knocking learning for learning a trace knock ignition timing is performed for every subdivided operation region. However, usual knocking control is performed only in the operation by the stoichiometric EGR mode, and is not performed in the operation by the lean mode. Because the adjustable range of an ignition timing in the lean mode is narrow, it is impossible substantially to retard an ignition timing from an MT ignition timing. Thus, in the lean mode, knocking learning is not also performed.

Transient knocking control is performed to suppress knocking that occurs at the time of switching from the lean mode to the stoichiometric EGR mode. At the time of switching from the lean mode to the stoichiometric EGR mode, the engine water temperature is lowered from 95° C. to 88° C. or less. However, as is expected from the configuration of the HT cooling system 50, lowering the engine water temperature is not superior in a response in comparison with raising the engine water temperature. Therefore, the time required for lowering the engine water temperature is not short. For example, the time required for raising the engine water temperature from 88° C. or less to 95° C. is set to a (a refers to heat transfer time). In this case, under a certain specification, the time required for lowering the engine water temperature from 95° C. to 88° C. or less is six seconds plus a. In this example, because the engine water temperature has not decreased to 88° C. or less yet whereas the operating mode was switched to the stoichiometric EGR mode, knocking is encouraged.

The means used for suppressing knocking in transient knocking control are the following three means. The first means is the IN-VVT 15. By operating the IN-VVT 15 to retard an IVC (this operation is referred to as "first operation"), an actual compression ratio is lowered and thereby a cylinder temperature is decreased. As a result, knocking is suppressed. When the IN-VVT 15 is an apparatus that varies a valve timing, the retard of the IVC is performed by retarding the valve timing. When the IN-VVT 15 is an apparatus that varies an operating angle, the retard of the IVC is performed by enlarging the operating angle. However, a retard threshold is set to the IVC. The IVC strongly influences turbulence in the combustion chamber 6. Therefore, to secure combustion stability, it is requested not to retard the IVC more than a predetermined angle (e.g., After Bottom Dead Center 50 degrees).

The second means is the oil jet apparatus 130. By operating the oil jet apparatus 130 to increase the oil jet amount (this operation is referred to as "second operation"), cooling of the piston 8 and the wall surface of the cylinder 4 on which the piston 8 slides is enhanced, and thereby knocking is suppressed. However, the oil jet amount cannot be larger than the maximum jet amount that is fixed from the maximum opening degree of the oil control valve 136.

The third means is the EGR apparatus 100. By operating the EGR apparatus 100 to increase the EGR amount (this operation is referred to as "third operation"), combustion is slowed down, and thereby knocking is suppressed. However, an upper limit to secure combustion stability is set to the EGR rate that is the ratio of EGR gas to in-cylinder gas. It is requested to adjust the opening degree of the EGR valve 106 so that the EGR amount does not become larger than the upper limit amount determined from the upper limit of the EGR rate.

The above-described three operations are effective in suppressing knocking, but on the other hand degradation in fuel economy performance will be caused in a greater or lesser degree. Thus, in the transient knocking control, the three operations are not performed at the same time from the beginning, but are performed one by one in a predetermined sequential order until knocking is settled. The order of executing the operations is the order of the faster response of a controlled variable to operation. Specifically, first the first operation is performed, next the second operation is performed, and then the third operation is performed. More specifically, at the beginning an IVC is retarded by the first operation. When knocking is not settled even if the IVC reaches a retard limit angle, next an oil jet amount is increased by the second operation. When knocking is not settled even if the oil jet amount reaches a maximum value, further an EGR amount is increased by the third operation. When knocking is not settled even if the EGR amount reaches an upper limit amount, finally retarding an ignition timing from a MBT ignition timing is performed.

Figure 5:
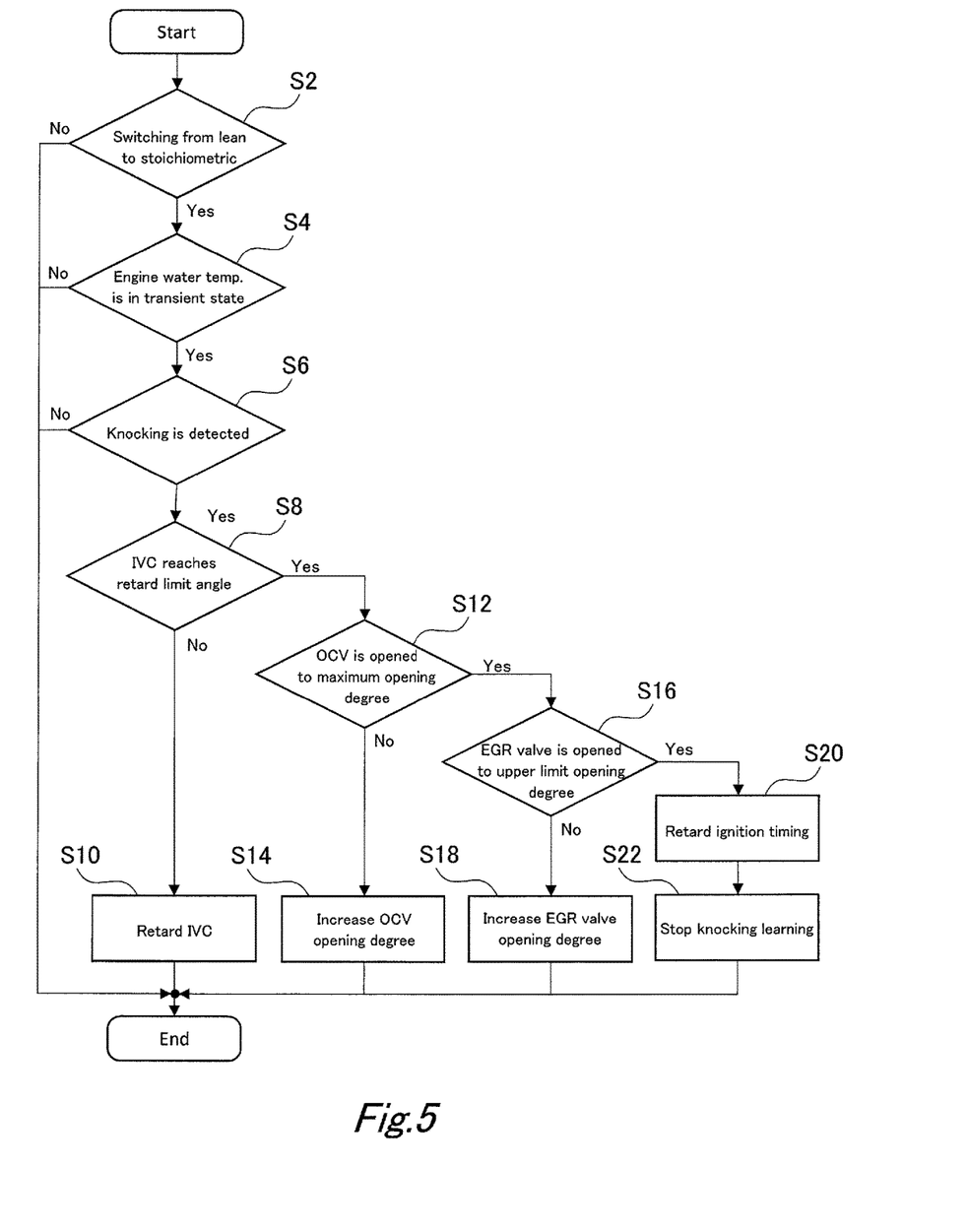
FIG. 5 is a flowchart that illustrates a control flow of transient knocking control of the embodiment.

FIG. 5 is a flowchart that illustrates the detail of the control flow of the transient knocking control outlined above. The control apparatus 120 reads out a program represented by this control flow from the ROM, and repeatedly executes the control flow at predetermined control periods that correspond to the clock speed of the CPU.

In step S2, the control device 120 determines whether or not switching from the lean mode to the stoichiometric EGR mode has been done. When the operation point of the engine 1 that is decided by engine speed and target torque moves into a stoichiometric EGR region from a lean region, switching from the lean mode to the stoichiometric EGR mode is performed. When the operation mode of the engine 1 is the lean mode, the control flow goes to end.

When the operation mode of the engine 1 is the stoichiometric EGR mode, next the control flow proceeds to step S4.

In step 4, the control device 120 determines whether or not engine water temperature is still varying from the target temperature (95° C.) of the lean mode to the target temperature (88° C. or less) of the stoichiometric EGR mode. That is, it is determined whether or not the engine water temperature is in transient state. This determination is carried out based on the engine water temperature measured by the engine water temperature sensor 68. When the engine water temperature is 88° C. or less, the control flow goes to end.

When the engine water temperature is in transient state where the engine water temperature does not reach 88° C. or less yet, next the control flow proceeds to step S6. In step S6, the control device 120 determines whether or not knocking is detected by the knocking sensor 124 (or by the combustion pressure sensor 22). When knocking does not detected, the control flow goes to end.

When knocking is detected, next the control flow proceeds to step S8. In step S8, the control device 120 determines whether or not an IVC is already retarded to a retard limit angle. When the IVC does not reach the retard limit angle yet, the knocking suppressing effect by retarding the IVC can be raised by further retarding the IVC and thereby lowering an actual compression ratio. In this case, next the control flow proceeds to step S10. In step S10, the control apparatus 120 performs the first operation to operate the IN-VVT 15 so as to retard the IVC. Note that, the operating method of the IN-VVT 15 in step S10 may be to retard the IVC by a predetermined angle for every control steps. However, from the viewpoint of suppressing knocking promptly, it is desirable to retard the IVC to the retard limit angle at a maximum speed.

When the IVC is already retarded to the retard limit angle, the control apparatus 120 suppresses knocking using another means. In this case, next the control flow proceeds to step S12. In step S12, the control apparatus 120 determines whether or not the oil control valve 136 is already opened to a maximum opening degree. When the oil control valve 136 is not opened to the maximum opening degree yet, the knocking suppressing effect by increasing the oil jet amount can be raised by further enlarging the opening degree of the oil control valve 136. In this case, next the control flow proceeds to step S14. In step S14, the control apparatus 120 performs the second operation to operate the oil control valve 136 as to increase the oil jet amount. Note that, the operating method of the oil control valve 136 in step S14 may be to enlarge the opening degree by a predetermined amount for every control steps. However, from the viewpoint of suppressing knocking promptly, it is desirable to open the oil control valve 136 to the maximum opening degree at a maximum speed.

When the oil control valve 136 is already opened to the maximum opening degree, the control apparatus 120 suppresses knocking using yet another means. In this case, next the control flow proceeds to step S16. In step S16, the control apparatus 120 determines whether or not an EGR amount is already increased to an upper limit amount. When the EGR amount is not increased to the upper limit amount yet, the knocking suppressing effect by increasing the EGR amount can be raised by further enlarging the opening degree of the EGR valve 106. In this case, next the control flow proceeds to step S18. In step S18, the control apparatus 120 performs the third operation to operate the EGR valve 106 as to increase the EGR amount. Note that, the operating method of the EGR valve 106 in step S18 may be to enlarge the opening degree by a predetermined amount for every control steps. However, from the viewpoint of suppressing knocking promptly, it is desirable to open at a maximum speed the EGR valve 106 to the opening degree that makes the EGR amount reach the upper limit amount.

When the EGR amount already reaches the upper limit amount, the control apparatus 120 suppresses knocking using a last means. In this case, next the control flow proceeds to step S20. In step S20, the control apparatus 120 retards an ignition timing from a MBT ignition timing. The MBT ignition timing used as a reference is the MBT ignition timing in the stoichiometric EGR mode. Note that, the operating method of an ignition apparatus in step S20 may be to retard the ignition timing by a predetermined angle for every control steps. However, because this operation is a temporary operation until the engine water temperature decreases enough, the operating method may be to greatly retard the ignition timing at a time so as to suppress knocking surely. Also, with respect to the ignition timing retard performed in step S20, knocking learning that is performed in the usual knocking control is not performed. The reason is that, if a retard amount obtained here is taken in as a learning value, the ignition timing will be always retarded after the engine water temperature converges to the target value, and thereby degradation in fuel economy performance will be invited. Thus, in step S22 following step S20, the control apparatus 120 stops knocking learning temporarily.

The knocking that is caused by response delay of the engine water temperature in switching from the lean mode to the stoichiometric EGR mode can be suppressed effectively by the transient knocking control being performed according to the control flow comprising the above-mentioned steps S2-S22.

By the way, the possibility of knocking decreases as the engine water temperature approaches the target temperature of the stoichiometric EGR mode, that is, as time elapses. Thus, after knocking is settled once, an operation to return a controlled condition to that of the stoichiometric EGR mode is performed by adversely tracing the steps of the above described control flow. The following is a specific description of an operation procedure after knocking is settled once. The operation procedure below is on the premise that retarding the ignition timing has been performed in the above described control flow.

When a settlement of knocking is confirmed based on a signal of the knock sensor 124 or combustion pressure sensor 22, first the control apparatus 120 performs advancing the ignition timing to the MBT ignition timing of the stoichiometric EGR mode.

Next, the control apparatus 120 operates the EGR apparatus 100 to realize a target EGR rate decided from the operating point of the engine 1, and thereby decreases the EGR amount that has increased to the upper limit amount. The timing when the EGR valve 106 begins to be closed may be a timing immediately after the ignition timing reaches the MBT ignition timing. However, this operation is an operation not to necessarily hurry unlike the operation for suppressing knocking. Therefore, the EGR valve 106 may begin to be closed when a certain period of time elapses after the ignition timing is advanced to the MBT ignition timing. The certain period of time may be a period of time necessary to confirm whether or not knocking reoccurs.

Then, the control apparatus 120 operates the oil jet apparatus 130 to decrease the oil jet amount to a prescribed jet amount in the stoichiometric EGR mode. The prescribed jet amount in the stoichiometric EGR mode is larger than a prescribed jet amount in the lean mode. In the stoichiometric EGR mode, an ignition timing is usually adjusted to a trace knock ignition timing by the knocking control. Therefore, cooling by oil jet in the stoichiometric EGR modes is strengthened than that in the lean mode so that the condition that is easy to generate knocking is not prepared. The timing when the oil control valve 136 begins to be closed may be a timing after the EGR valve 106 begins to be closed to a target opening degree. Specifically, the timing may be an arbitrary timing before the EGR valve 106 is closed to the target opening degree, or may be an arbitrary timing after the EGR valve 106 is closed to the target opening degree.

Finally, the control apparatus 120 operates the IN-VVT 15 to advance the IVC from the retard limit angle to a setting angle decided from the operating point of the engine 1. The timing when the IVC begins to be advanced may be an arbitrary timing in a period of time after the oil control valve 136 begins to be closed before the engine water temperature converges to the target temperature in the stoichiometric EGR mode. Note that, the operating method of the IN-VVT 15 here may be to advance the IVC by a predetermined angle for every control steps, or may be to advance the IVC to the setting angle in the stoichiometric EGR mode at a maximum speed.

When the ignition timing is advanced to the MBT ignition timing and the adjustment of all the manipulated variables of the EGR apparatus 100, oil jet apparatus 130 and IN-VVT 15 is completed, the control apparatus 120 finishes the transient knocking control, and starts the usual knocking control. And the control apparatus 120 starts the knocking learning with the start of the usual knocking control.

7. One Example of Operations of Engine

Figure 6:
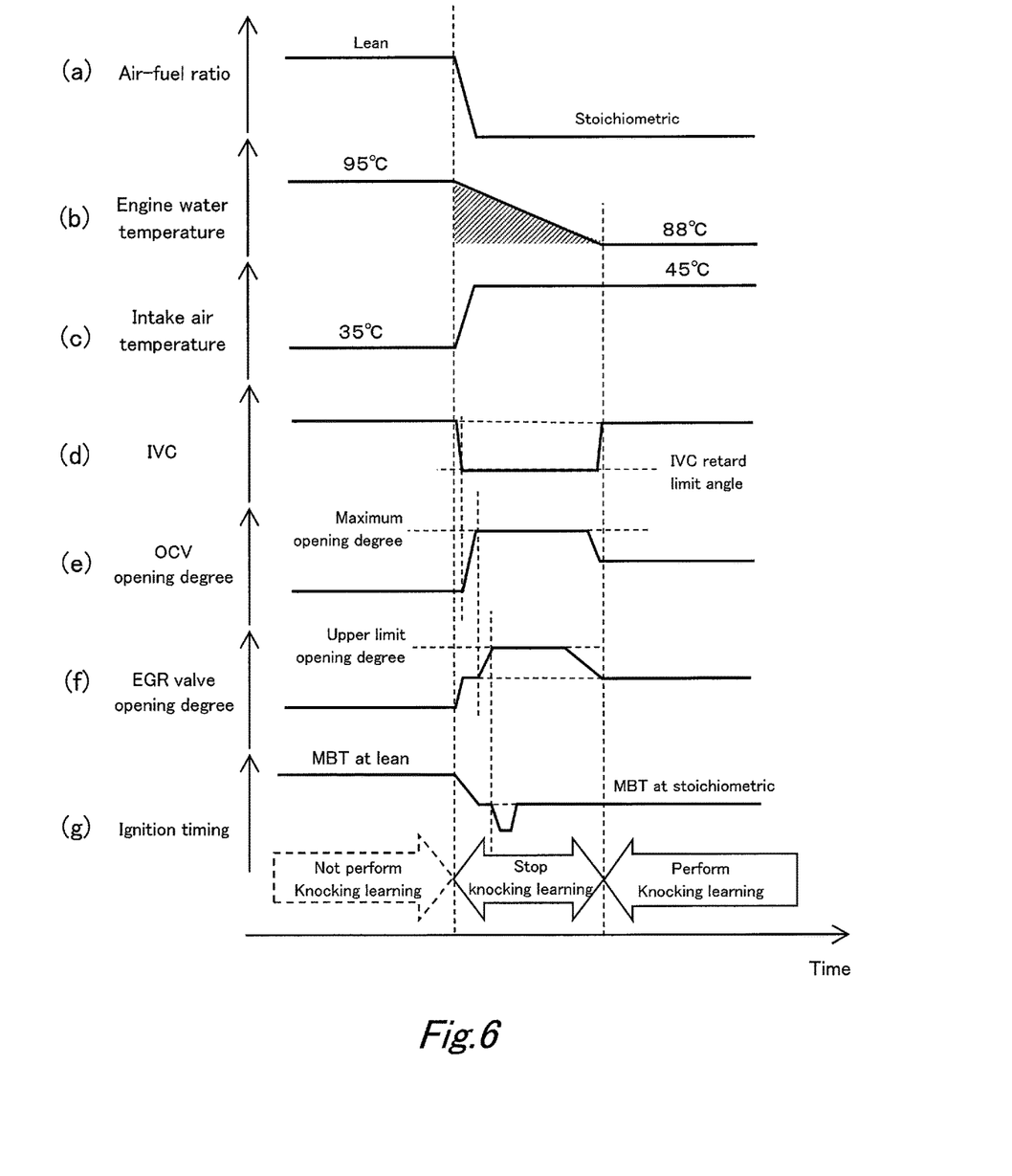
FIG. 6 is a time chart illustrating one example of operations of the internal combustion engine when the knocking control are executed with intake air temperature control and engine water temperature control.

FIG. 6 is a time chart illustrating one example of operations of the engine 1 when the above described knocking control (transient knocking control) is executed with the intake air temperature control and the engine water temperature control. In FIG. 6, changes with time in the following parameters are illustrated for a case where, with respect to FIG. 4, the load is increased from a lean region to a stoichiometric EGR region while the engine speed is kept constant. The parameters are: (a) the air-fuel ratio that is a parameter relating to switching of the operation mode; (b) the engine water temperature and (c) the intake air temperature that are controlled variables for the intake air temperature control and the engine water temperature control; (d) the IVC, (e) the opening degree of the OCV, and (f) the opening degree of the EGR valve that are manipulated variables for the transient knocking control, and (g) the ignition timing.

In the lean region, the air-fuel ratio is set to a predetermined lean air-fuel ratio. Although the turbocharging pressure is increased in accordance with an increase in the load and the temperature of intake air entering the intercooler 72 rises in accordance with an increase in the turbocharging pressure, the intake air temperature measured by the intake-air temperature sensor 76 is kept constant at 35° C. To realize this, the electric water pump flow rate of the LT cooling system 30 is increased in accordance with an increase in the load. Further, the engine water temperature measured by the engine water temperature sensor 68 is kept constant at 95° C. Since cooling loss increases in accordance with an increase in the load, the electric water pump flow rate of the HT cooling system 50 and the opening degree of the flow-channel leading to the radiator 60 (the opening degree of the third HT flow-channel 56 of the multifunction valve 66) are increased in accordance with an increase in the load so that the engine water temperature is constant.

In the lean region, the respective manipulated variables of the IVC, the OCV opening degree (the opening degree of the oil control valve 136), and the EGR valve opening degree are set to the target opening degree or setting opening degree in the lean mode. With regard to the EGR valve opening degree, it is set to zero because the introduction of the EGR gas is not performed in the lean mode of the present embodiment. The ignition timing is adjusted to the MBT ignition timing.

Subsequently, when the operating point of the engine 1 moves from the lean region to the stoichiometric EGR region, the operation mode is switched from the lean mode to the stoichiometric EGR mode. This switching of the operation mode is realized by switching the air-fuel ratio from the lean air-fuel ratio to the theoretical air-fuel ratio as shown in chart (a), and also increasing the EGR valve opening degree in a step response manner from zero as shown in chart (f) to increase the EGR amount from zero to an amount in accordance with the engine speed and target torque.

Further, when the operating point of the engine 1 moves from the lean region to the stoichiometric EGR region, the intake air temperature is raised from 35° C. to 45° C., and the engine water temperature decreases to a temperature equal to or less than 88° C. To realize this, at the timing of switching the operation mode, the electric water pump flow rate of the HT cooling system 50 and the opening degree of the flow-channel leading to the radiator 60 (the opening degree of the third HT flow-channel 56 of the multifunction valve 66) are increased in a step response manner, and the electric water pump flow rate of the LT cooling system 30 is decreased in a step response manner.

However, under the environment where a large amount of heat is radiated from the engine 1, it is not easy to decrease the intake air temperature and the engine water temperature whereas it is easy to increase the intake air temperature and the engine water temperature. That is, the response delay of the engine water temperature to the operation of the HT cooling system 50 is big whereas the intake air temperature shows a good response to the operation of the LT cooling system 30. Therefore, it takes a certain period of time from the switching of the operating mode until the engine water temperature decreases to 88° C. or less.

Until the engine water temperature decreases to 88° C. or less, knocking is easy to occur by lack of cooling. An operation example of the engine 1 when knocking occurred immediately after the change of the operating mode is shown in FIG. 6. When knocking is detected, the IVC is retarded to the retard limit angle as shown in chart (d). When knocking is still not settled, the oil control valve 136 is opened to the maximum opening degree as shown in chart (e) to increase the oil jet amount to the maximum jet amount. When knocking continues to occur yet, the EGR valve 106 is opened to the upper limit opening degree as shown in chart (f) to increase the EGR amount to the upper limit amount. When knocking is still not settled, the ignition timing is retarded from the MBT ignition timing as shown in chart (g).

Knocking is finally suppressed by the retard of the ignition timing. After that, the ignition timing is advanced to the MBT ignition timing again as shown in chart (g). When knocking does not reoccur after the advance of the ignition timing, the EGR valve 106 is closed to the former opening degree as shown in chart (f) to decrease the EGR amount to an amount depending on the engine speed and target torque. Furthermore, the oil control valve 136 is closed to the setting opening degree in the stoichiometric EGR mode as shown in chart (e) to decrease the oil jet amount. Furthermore, the IVC is advanced from the retard limit angle to the setting angle in the stoichiometric EGR mode (e.g., After Bottom Dead Center 10-25 degrees) as shown in chart (d).

When the IVC is advanced to the setting angle in the stoichiometric EGR mode and the engine water temperature decreases to 88° C. or less, the control apparatus 120 finishes the transient knocking control, and starts the usual knocking control accompanied by the knocking learning.

8. Other Embodiment

In the above described embodiment, when knocking is detected in the transient state where the engine water temperature is still varying, the above described three operations are performed in order of the first operation, the second operation, the third operation. However, this sequential order may be changed. Also, instead of performing all of the first to third operations, when knocking is not settled after having performed two operations of the first to third operations, the retard of the ignition timing may be used for suppressing knocking. Furthermore, when knocking is not settled after having performed one operation of the first to third operations, the retard of the ignition timing may be used for suppressing knocking.

What is claimed is:
1. An internal combustion engine which, in accordance with an operating region, switches between a stoichiometric mode in which operation is performed at a theoretical air-fuel ratio and a lean mode in which operation is performed at an air-fuel ratio that is leaner in fuel than the theoretical air-fuel ratio, comprising: a knocking sensor for detecting knocking; a variable valve apparatus that is capable of varying a closing timing of a intake valve; an oil jet apparatus that jets oil toward a back face of a piston; an EGR apparatus that recirculates a part of exhaust gas to an intake passage; an engine water temperature adjustment apparatus that adjusts a temperature of cooling water that flows through an exhaust side of an engine head; and a control apparatus that operates at least the variable valve apparatus, the oil jet apparatus, the EGR apparatus and the engine water temperature adjustment apparatus; wherein the control apparatus is configured to operate the engine water temperature adjustment apparatus so that the temperature of cooling water that passes through the engine head enters a first temperature region when the internal combustion engine operates in the lean mode, and to operate the engine water temperature adjustment apparatus so that the temperature of cooling water that passes through the engine head enters a second temperature region that is a lower temperature region than the first temperature region when the internal combustion engine operates in the stoichiometric mode, and wherein the control apparatus is configured to perform a first operation to operate the variable valve apparatus so as to retard the closing timing of the intake valve, a second operation to operate the oil jet apparatus so as to increase an oil jet amount, and a third operation to operate the EGR apparatus so as to increase an EGR amount when knocking is detected after switching is started from the lean mode to the stoichiometric mode, wherein the control apparatus is configured to retard an ignition timing from a MBT ignition timing when knocking is still detected by the knocking sensor after having performed all the operations of the first to third operations.

2. The internal combustion engine according to claim 1, wherein the control apparatus is configured to perform the first operation of the first to third operations first.

* * * * *